United States Patent [19]
Daus et al.

[11] Patent Number: 6,128,919
[45] Date of Patent: Oct. 10, 2000

[54] PROCESS FOR SEPARATING NATURAL GAS AND CARBON DIOXIDE

[75] Inventors: Paul A. Daus, Sugar Land; Charles R. Pauley, deceased, late of Houston, both of Tex., by Robert S. Pauley, legal representative

[73] Assignee: Messer Griesheim Industries, Inc., Malvern, Pa.

[21] Appl. No.: 09/158,271

[22] Filed: Sep. 22, 1998

Related U.S. Application Data

[63] Continuation-in-part of application No. 09/057,126, Apr. 8, 1998.

[51] Int. Cl.$^7$ .................................. F25J 3/00; B01D 53/22
[52] U.S. Cl. ......................................... 62/624; 95/51; 96/9
[58] Field of Search ........................ 62/624, 655; 95/51; 96/9

[56] References Cited

U.S. PATENT DOCUMENTS

| | | | |
|---|---|---|---|
| 2,065,112 | 12/1936 | Bottoms | 23/2 |
| 2,143,283 | 1/1939 | Schmidt | 62/175.5 |

(List continued on next page.)

FOREIGN PATENT DOCUMENTS

| | | |
|---|---|---|
| 658973 | 3/1963 | Canada . |
| 0 051 469 | 5/1982 | European Pat. Off. . |
| 0 410 845 A1 | 1/1991 | European Pat. Off. . |
| 0 799 634 A1 | 10/1997 | European Pat. Off. . |
| 0658245 | 10/1997 | European Pat. Off. . |
| 59-69415 | 4/1984 | Japan . |
| 59-207827 | 11/1984 | Japan . |
| 62-167390 | 7/1987 | Japan . |
| 63-151332 | 6/1988 | Japan . |
| 63-305915 | 12/1988 | Japan . |
| 64-43329 | 2/1989 | Japan . |
| 1108512 | 4/1968 | United Kingdom . |
| 1471699 | 4/1977 | United Kingdom . |
| 1590813 | 6/1981 | United Kingdom . |
| 2151597 | 7/1985 | United Kingdom . |
| 2174379 | 11/1986 | United Kingdom . |
| 2183499 | 6/1987 | United Kingdom . |
| 2186682 | 8/1987 | United Kingdom . |
| WO 96/11048 | 4/1996 | WIPO . |

OTHER PUBLICATIONS

Bruno, Earl R., "Drilling With Air," *The Petroleum Engineer*, Jan. 1956, B21–B24.

S.P. Shouldice, "Liquid Nitrogen Developments and Applications in Drilling and Completion Operations," 15$^{th}$ Annual Technical Mtg. P&NG Division, C.L.M., Calgary, May 1964, pp. 158–164.

Billy C. Caskey, "Use of Inert Drilling Fluid to Control Geothermal Drill Pipe Corrosion," Corrosion/81, paper No. 224, Apr. 6–10, 1981, pp. 224:1–224:12.

Raghu S. Narayan, "Applicaion of Monsanto Prism Separators for CO2 Removal," Paper presented at Permian Basin Regional Mtg of Gas Processors Assoc., May 6, 1982.

Schell, William J., "Use of Membranes for Biogas Treatment," *Energy Progress*, Jun. 1983, vol. 3, No. 2, pp. 96–100.

S.A. Stern et al, "Recycle and Multimembrane Permeators for Gas Separations," *Journal of Membrane Science*, 20(1984) pp. 25–43.

(List continued on next page.)

*Primary Examiner*—William Doerrler
*Attorney, Agent, or Firm*—Carr & Storm, L.L.P.

[57] ABSTRACT

A process for separating natural gas and carbon dioxide from a raw feed stream, such as in carbon dioxide for EOR processes. Separation is by membrane separation at low pressures. By utilizing low pressure separation, highly selective membranes can be used and recycling becomes practical.

53 Claims, 3 Drawing Sheets

U.S. PATENT DOCUMENTS

| | | |
|---|---|---|
| 2,159,434 | 5/1939 | Frey .......................................... 196/94 |
| 2,377,966 | 12/1945 | Reed .......................................... 23/150 |
| 2,399,142 | 4/1946 | Reed ............................................. 23/2 |
| 2,583,601 | 1/1952 | Schwertz ................................. 183/115 |
| 2,786,652 | 3/1957 | Wells ......................................... 255/24 |
| 2,970,106 | 1/1961 | Binning et al. .......................... 208/347 |
| 3,137,654 | 6/1964 | Johnson et al. .......................... 252/189 |
| 3,250,080 | 5/1966 | Garwin ........................................ 62/24 |
| 3,286,778 | 11/1966 | Jackson ..................................... 175/69 |
| 3,612,192 | 10/1971 | Maguire, Jr. ............................... 175/17 |
| 4,119,417 | 10/1978 | Heki et al. ................................. 66/158 |
| 4,130,403 | 12/1978 | Cooley et al. ............................... 55/16 |
| 4,136,747 | 1/1979 | Mallory et al. ........................... 175/66 |
| 4,161,222 | 7/1979 | Pye ............................................ 175/66 |
| 4,181,675 | 1/1980 | Makin et al. ........................ 260/449.5 |
| 4,238,211 | 12/1980 | Stuart ......................................... 62/20 |
| 4,264,338 | 4/1981 | Null ............................................ 55/16 |
| 4,374,657 | 2/1983 | Schendel et al. ........................... 62/19 |
| 4,386,944 | 6/1983 | Kimura ....................................... 55/16 |
| 4,417,449 | 11/1983 | Hegarty et al. .............................. 62/28 |
| 4,435,191 | 3/1984 | Graham ....................................... 55/16 |
| 4,466,946 | 8/1984 | Goddin, Jr. et al. ..................... 423/228 |
| 4,477,419 | 10/1984 | Pearce et al. ............................ 423/228 |
| 4,529,411 | 7/1985 | Goddin, Jr. et al. ........................ 55/16 |
| 4,542,010 | 9/1985 | Roman et al. ........................... 423/579 |
| 4,548,619 | 10/1985 | Steacy ......................................... 55/16 |
| 4,589,896 | 5/1986 | Chen et al. ................................. 62/28 |
| 4,597,777 | 7/1986 | Graham ....................................... 55/16 |
| 4,599,096 | 7/1986 | Burr ............................................ 62/27 |
| 4,602,477 | 7/1986 | Lucadamo ................................... 62/24 |
| 4,639,257 | 1/1987 | Duckett et al. .............................. 55/16 |
| 4,659,343 | 4/1987 | Kelly ........................................... 55/16 |
| 4,690,695 | 9/1987 | Doshi .......................................... 55/16 |
| 4,701,187 | 10/1987 | Choe et al. .................................. 55/16 |
| 4,717,395 | 1/1988 | Chiao .......................................... 55/16 |
| 4,759,780 | 7/1988 | Yamada et al. ........................... 55/158 |
| 4,781,907 | 11/1988 | McNeill .................................... 423/351 |
| 4,797,141 | 1/1989 | Mercader et al. ........................... 62/17 |
| 4,871,378 | 10/1989 | Pinnau ........................................ 55/16 |
| 4,894,068 | 1/1990 | Rice ............................................ 55/16 |
| 4,936,887 | 6/1990 | Waldo et al. . |
| 4,960,579 | 10/1990 | Campbell ................................. 423/351 |
| 4,990,168 | 2/1991 | Sauer et al. ................................. 62/24 |
| 5,032,148 | 7/1991 | Baker et al. ................................. 55/16 |
| 5,090,971 | 2/1992 | Barbier ........................................ 55/16 |
| 5,102,432 | 4/1992 | Prasad ......................................... 55/16 |
| 5,207,806 | 5/1993 | Lagree et al. ............................... 55/16 |
| 5,233,837 | 8/1993 | Callahan ..................................... 62/38 |
| 5,234,471 | 8/1993 | Weinberg .................................... 95/47 |
| 5,275,640 | 1/1994 | Schroter et al. ........................... 95/101 |
| 5,282,968 | 2/1994 | Lee ........................................... 210/640 |
| 5,282,969 | 2/1994 | Xu ............................................ 210/640 |
| 5,314,528 | 5/1994 | Monereau ................................... 95/55 |
| 5,388,650 | 2/1995 | Michael .................................... 175/71 |
| 5,411,721 | 5/1995 | Doshi et al. ............................. 423/220 |
| 5,445,669 | 8/1995 | Nakabayashi et al. ....................... 96/5 |
| 5,482,539 | 1/1996 | Callahan ..................................... 95/51 |
| B1 5,388,650 | 9/1997 | Michael .................................... 175/71 |

OTHER PUBLICATIONS

D.J. Stookey et al, "Natural Gas Processing With Prism Separators," AIChE Winter Annual Meeting, Mar. 13, 1984, Atlanta, Georgia, paper 33F.

J.E. Smith et al, "Development of the Cotton Valley Geopressure Zone in Panola County, Texas, Using Air/Drilling and Openhole Completion Techniques," Society of Petroleum Engineers (SPE14657), Tyler, TX Apr. 21–22, 1986, pp. 67–78.

J.E. Perrin, et al., "Separation of a Helium–Methane Mixture in Permeators with Two Types of Polymer Membranes," AIChE Journal, Nov. 1986, vol. 32, No. 11, pp. 1889–1901.

A.K. Fritzsche et al, "Gas Separations by Membrane Systems," Chemical Economy & Engineering Review, vol. 19, No. 1–2–3, pp. 19–29.

Wilbur C. Kratz, et al., "Hydrogen and Carbon Dioxide Coproduction from SMR Off–Gas by Pressure Swing Adsorption," AIChE National Mtg in New York, Nov. 20, 1987.

M. Sidhoum, et al., "Experimental Behavior of Asymmetric CA Membranes and Its Use in Novel Separation Schemes," AIChE Symposium Series, No. 261, vol. 84, pp. 102–112.

K.D. Kothe et al, "A Study of the Separation Behavior of Different Membrane Columns with Respect to Ternary Gas Mixtures," Journal of Membrane Science, 46(1989) pp. 261–281.

Spillman, Robert W. , "Economics of Gas Separation Membranes," Chemical Engineering Progress, Jan. 1989, pp. 41–62.

Robert W. Spillman et al, "Membrane Gas Treating," Proceedings of the 68$^{th}$ Annual Gas Processors Assoc. Convention, pp. 186–196.

M.S. Dinello et al, "Bulk CO2 Removal Achieved Through Membrane Separation," SPE Production Engineering, Feb. 1989, vol. 4 No. 1, pp. 88–92.

"Membrane Separation Offers Low–cost Inert Gas Safety," Ocean Industry, Jul. 1990, pp. 27–29.

"Nitrogen Generators," Power News, vol. 31–No. 1, Spring 1991.

Shelley, Suzanne, "Out of Thin Air," Chemical Engineering, Jun. 1991, pp. 30–41.

1991–1992 Stewart & Stevenson Petroleum Products Catalog.

P.D. Allen, "Nitrogen Drilling System for Gas Drilling Applications," Society Of Petroleum Engineers 28320, Sep. 1994, pp. 291–295.

Downey, Robert A., "On–Site Generated Nitrogen For Oil and Gas Well Drilling and Other Applications," CAODC Spring Drilling Conference, Apr. 19–21, 1995, Calgary, Alberta, Canada.

PROCESS FOR SEPARATING NATURAL GAS AND CARBON DIOXIDE

CROSS-REFERENCE TO RELATED APPLICATION

This application is a continuation-in-part of U.S. patent application Ser. No. 09/057,126, filed Apr. 8, 1998, entitled MEMBRANE PROCESS FOR PRODUCING CARBON DIOXIDE, to Paul A. Daus, et al.

TECHNICAL FIELD OF THE INVENTION

The present invention relates to a process for separating natural gas and carbon dioxide from a raw feed stream. More particularly, the present invention relates to a process for recovering high purity carbon dioxide and methane from a raw feed stream where carbon dioxide is utilized in enhanced oil recovery.

BACKGROUND OF THE INVENTION

Natural gas streams containing carbon dioxide in high concentrations occur naturally and as the result of enhanced oil recovery (EOR) operations. During EOR operations, carbon dioxide is injected into mature oil fields to improve the miscibility of the oil and enhance its production to the surface. Gas returning to the surface, along with the oil, contains hydrocarbon gases and carbon dioxide. The carbon dioxide is separated from the hydrocarbon gases and reinjected. The hydrocarbon stream is further treated and either used for fuel gas or sold to a pipeline.

Heretofore, attempts to recover carbon dioxide from associated gases were by processes using a chemical solvent to scrub the gas and thereafter distilling to recover the carbon dioxide. Such methods were costly and met with problems regarding corrosion and solvent degradation. Examples of such processes and methods to alleviate the corrosion problems are found in U.S. Pat. No. 2,065,112 which issued in 1936, U.S. Pat. No. 2,399,142 which issued in 1946, U.S. Pat. No. 2,377,966 which issued in 1945, U.S. Pat. No. 4,477,419 which issued in 1984, U.S. Pat. No. 3,137,654 which issued in 1964. The alkanolamine process described in some of these patents is still widely used today.

More recently, commercial membrane technology has been developed for separating acid gases like carbon dioxide and hydrogen sulfide from light hydrocarbon gases. Examples of such art are found in U.S. Pat. No. 4,130,403 which issued Dec. 19, 1978 to T. E. Cooley et. al., U.S. Pat. No. 4,639,257 which issued Jan. 27, 1987 to Melvyn Duckett et. al., and U.S. Pat. No. 5,233,837 which issued Aug. 10, 1993 to Richard Callahan. The features of these patents, particularly the use of membrane separation, was a definite step forward in the carbon dioxide separation art. However, the prior art in this field continues to suffer from overall efficiency of the process and undesirable membrane life. Furthermore, the prior art is not readily adapted to low feed stream pressures.

Accordingly, a continuing search has been directed to the development of a system and method which can separate carbon dioxide from natural gas, particularly in low pressure EOR processes.

SUMMARY OF THE INVENTION

The invention includes a process for separating carbon dioxide from a raw feed stream containing hydrocarbon gases and carbon dioxide. Compared to conventional processes, this process requires less power because the membrane operates at relatively low feed stream pressures. Relatively high purity carbon dioxide and a separated hydrocarbon gas are recovered.

In one aspect of the invention, a membrane having relatively high selectivities may be utilized to increase the purity of recovered gases.

In another aspect of the invention, the feed gas stream may be dehydrated, to protect the membrane, to increase the efficiency and effectiveness of gas separation, and to reduce power requirements.

In yet another aspect of the invention, liquid hydrocarbons are removed from the feed gas stream to protect the membrane, to increase the efficiency and effectiveness of the gas separation, and to reduce power requirements.

In still another aspect of the invention, turbo expansion of the feed stream gas is incorporated to recover power upstream of the first membrane.

In still another aspect of the invention, membranes are employed in a multi-stage configuration.

In yet another aspect of the invention, gas from one or more downstream membrane stages is recycled to one or more upstream stages, to heighten the purity of recovered gas and the system efficiency.

In still another aspect of the invention, a feed stream is passed into the bore of the membrane to separate a portion of one or more factions of the feed stream.

BRIEF DESCRIPTION OF THE DRAWINGS

A more complete understanding of the invention and its advantages will be apparent from the detailed description taken in conjunction with the accompanying drawings in which.

DETAILED DESCRIPTION OF THE INVENTION

Figure 1:
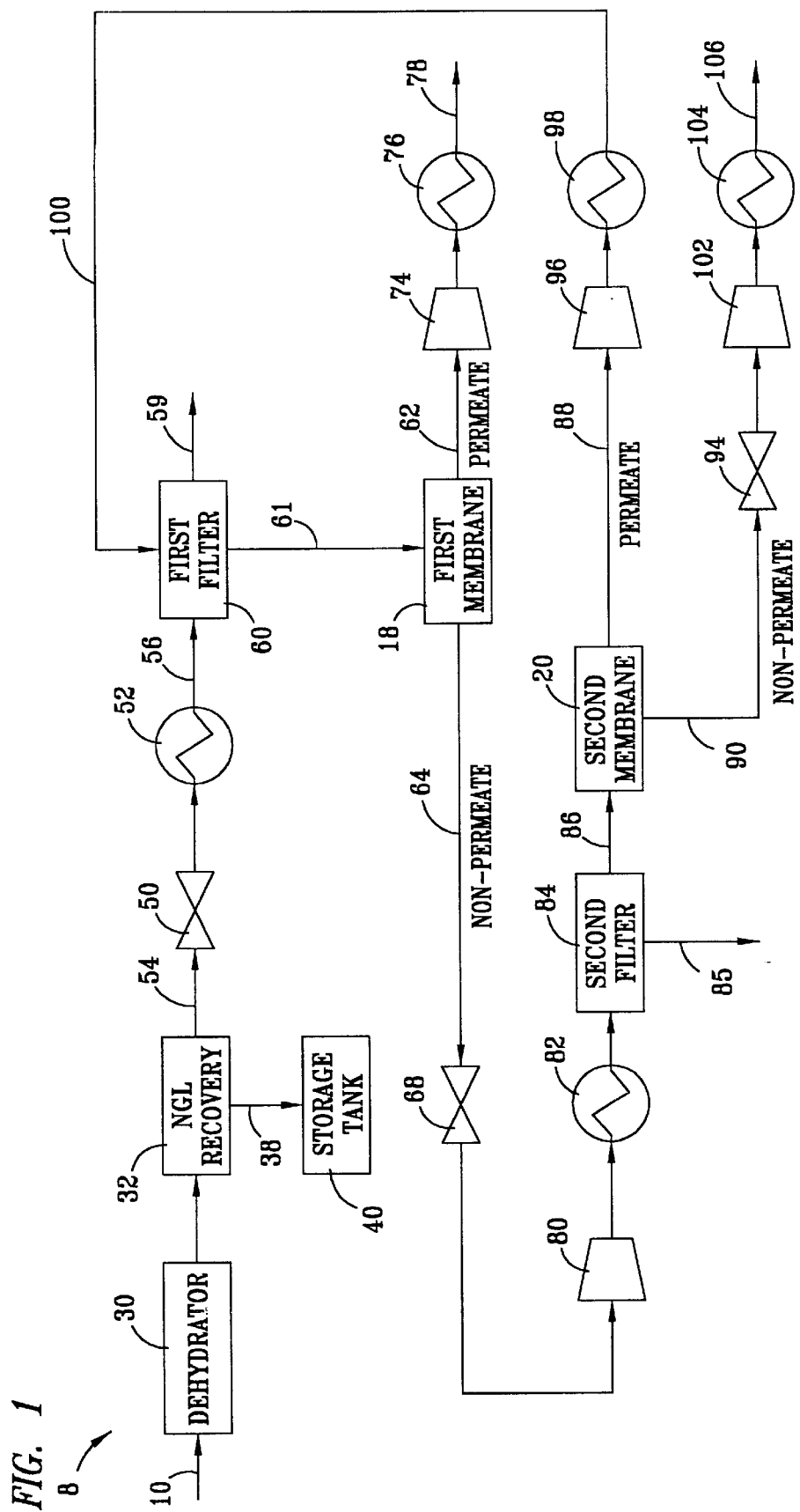
FIG. 1 is a diagrammatic view of a process embodying features of the present invention.

In the discussion of the FIGURES, the same reference numerals will be used throughout to refer to the same or similar components. In the interest of conciseness and clarity, various other components known to the art, such as wellheads, valves, instruments, and the like necessary for the operation of the process, have not been shown or discussed in detail.

In accordance with the present invention, a process is disclosed for separating carbon dioxide from a raw gas feed stream which contains natural gas and carbon dioxide and may contain other constituents such as water, nitrogen, oxygen, and hydrogen sulfide. Such a raw feed gas stream may come from any of a number of sources, but is often a by-product of enhanced oil recovery (EOR) operations. It should be understood that the pressures and volumes of by-product streams from EOR operations vary over time and from location to location. Therefore, the system described is sufficiently flexible to be used with raw gas steams having optimum pressure, low pressure, or high pressure, as will be described below with respect to FIGS. 1, 2, and 3, respectively.

FIG. 1 illustrates a process 8 for separating carbon dioxide from a raw gas feed stream at an optimum pressure for a first membrane 18 and a second membrane 20, such optimum pressure ranging from about 75 to about 150 psig and, typically, from about 90 to about 110 psig and, preferably, being about 90 psig. As discussed further below, the membranes 18 and 20 are preferably bore-fed, highly selective, hollow-fiber membranes operable at relatively low pressures, and are effective to increase the purity of recovered gases.

The raw feed gas stream at the optimum pressure enters a dehydration column 30 via a line 10. In the dehydration column 30, water in the raw feed gas stream is adsorbed on a desiccant (not shown) and the dry gas is delivered to a natural gas liquids (NGL) recovery unit 32. In the NGL recovery unit 32, the dehydrated feed gas stream is cooled to a temperature sufficient to condense a portion of the feed stream, primarily valuable heavier hydrocarbons which are then removed via a line 38 to a storage tank 40.

The resulting treated raw gas feed stream is then delivered downstream via a line 54 through a pressure control valve 50 and heat exchanger 52 to form a forst a;tered feed stream which is delivered and via a line 56 to a first filtering system 60. The pressure control valve 50 finely controls the pressure of the gas stream so that, just upstream of the first membrane 18, the pressure of the gas stream is in the range of from about 75 to about 150 psig and, typically, from about 90 to about 110 psig and, preferably, about 90 psig, for optimum separation. The heat exchanger 52 finely adjusts the temperature so that, just upstream of the first membrane 18, the temperature of the gas stream is in the range of from about 75° F. to about 150° F. and, typically, from about 75° F. to about 120° F. and, preferably, about 100° F., for optimum separation.

The temperature and pressure controlled first altered feed stream in the line 56 and a recycle stream (described below) in a line 100 are passed through the first filtering system 60 where the streams are mixed and coalesced, thereafter absorption filtered and thereafter particulate filtered to form a first stage membrane feed stream on a line 61, and a waste product on a line 59, which waste product is treated in any suitable manner well-known in the art. The first stage membrane feed stream enters the bore (not shown) of the first stage membrane 18, and is separated into a high purity first permeate stream 62 and a first nonpermeate stream 64. The bore side pressure within the membrane 18 is controlled by a pressure control valve 68 to maintain the pressure differential of the non permeate stream 64 in a range of from about 5 to about 30 psig and, preferably, about 15 psig.

The high purity first permeate stream 62 passing from the first stage membrane 18 is compressed by a compressor 74 and cooled by a heat exchanger 76. The compressed and cooled first permeate stream 62 is then recovered via a line 78 and transferred to a pipeline (not shown) for EOR, is liquified, or is employed in other suitable applications.

The temperature and pressure of the nonpermeate stream 64 discharged from the first stage membrane 18 are altered to correspond to optimum operating temperature and pressure ranges of the second stage membrane 20 by passing the stream 64 through a compressor 80 and a heat exchanger 82. The altered stream then passes through a second filtering system 84 to form a second stage membrane feed stream. While not shown, within the second filtering system 84, the stream 64 passes through a coalescing filter, thereafter through an absorption filter, and thereafter through a particulate filter. The filtered, temperature and pressure altered second stage membrane feed stream is thereafter passed via a line 86 into the bore (not shown) of the second stage membrane 20 wherein the nonpermeate stream is separated into a second, or recycle, permeate stream 88 and a second nonpermeate stream 90. The pressure of the stream 90 is controlled by a pressure control valve 94. The filter 84 also generates a waste product onto a line 85 which waste product is treated in any suitable manner well-known in the art.

A compressor 96 and heat exchanger 98 thereafter alter the pressure and temperature of the second permeate stream 88 to preselected pressure and temperature ranges corresponding to optimum operating ranges of the first membrane 18. The altered second permeate stream 88 is then passed via the line 100 back to the first filtering system 60 for additional recycling through the membranes 18 and 20.

The nonpermeate stream 90 passing from the second stage membrane 20 is compressed by a compressor 102 and cooled by a heat exchanger 104. The compressed and cooled nonpermeate stream 90 is recovered via a line 106 and transferred to a pipeline, used as fuel, or employed in other suitable applications.

Figure 2:
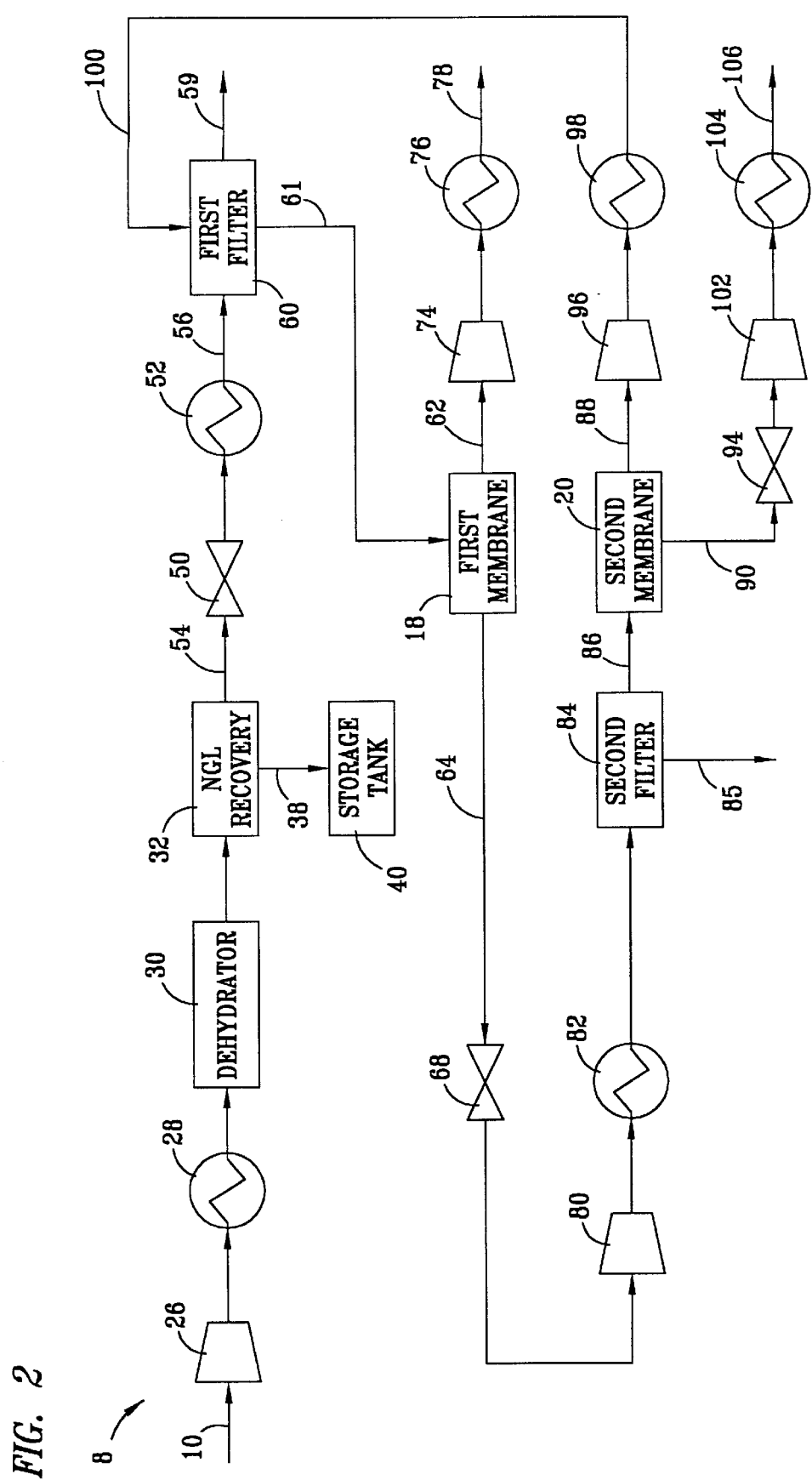
FIG. 2 is a diagrammatic view of a first alternate embodiment of the process shown in FIG. 1 in which the feed stream pressure is relatively low.
Figure 3:
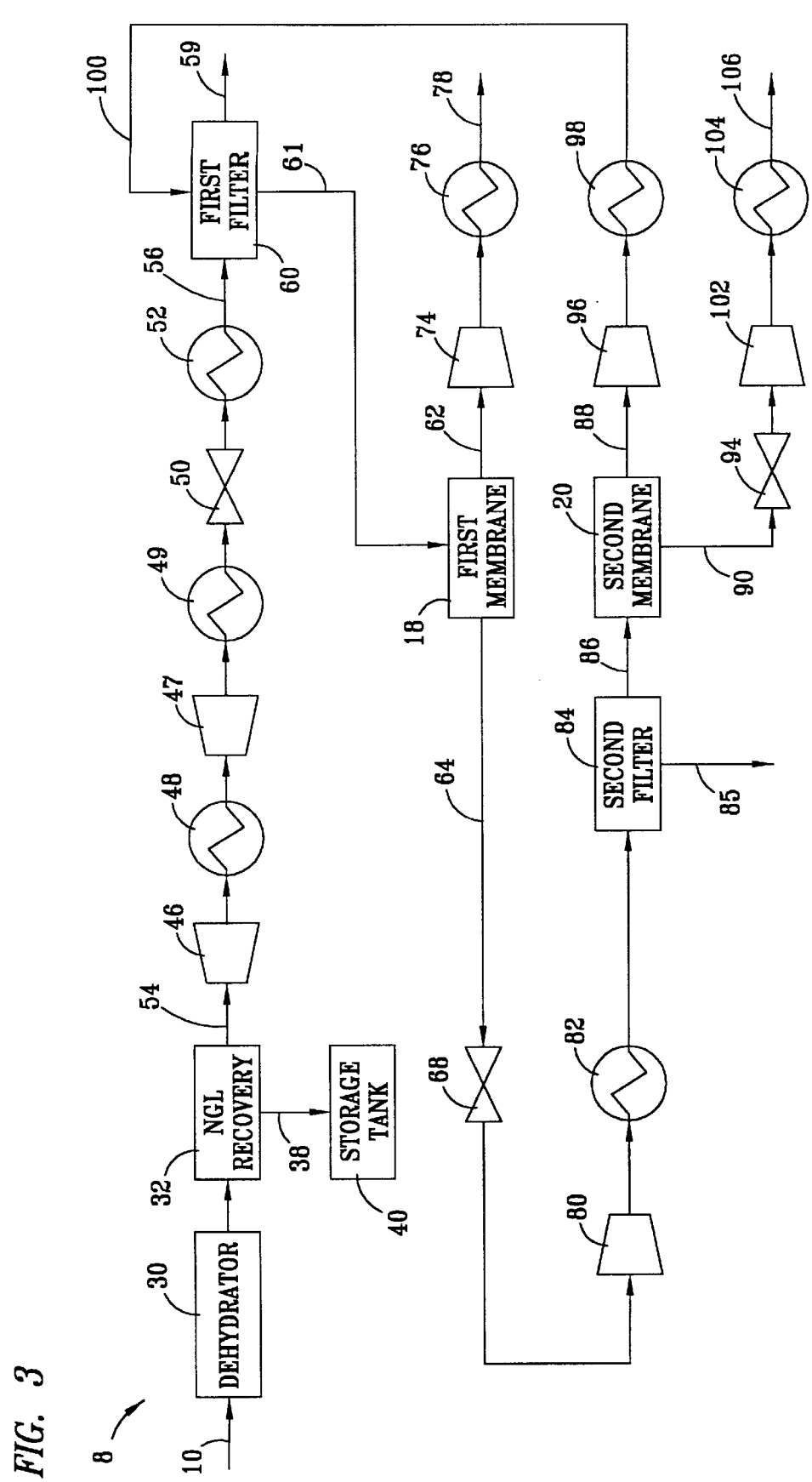
FIG. 3 is a diagrammatic view of a second alternate embodiment of the process shown in FIG. 1, in which the feed stream pressure is relatively high.

FIGS. 2 and 3 depict alternate embodiments of the process 8 shown in FIG. 1. Since the embodiments depicted in FIGS. 2 and 3 contain many components that are identical to those of the previous embodiment, these components are referred to by the same reference numerals and will not be described in any further detail.

According to the embodiment shown in FIG. 2, the process 8 is adapted to receive a relatively low pressure raw feed gas stream on the line 10. To this end, prior to entering the dehydrator 30, the feed stream passes through and is compressed by a compressor 26 by which the pressure is increased to the optimum pressure for the membranes 18 and 20. The compressed stream is then passed through a heat exchanger 28 by which the compressed feed stream is cooled and thereafter delivered to the dehydration column 30. The embodiment of FIG. 2 is otherwise identical to that of FIG. 1.

According to the embodiment shown in FIG. 3, the raw feed gas stream enters the process 8 via the line 10 at a pressure higher than the optimum pressure for the membranes 18 and 20 and is passed through the dehydration column 30 and NGL recovery unit 32 as described above. The pressure of the treated gas stream is then let down to the optimum pressure for membranes 18 and 20 through a series of expansion valves or turbo expanders, such as two turbo expanders 46 and 47. The refrigeration created by the expansion of the gas is recovered in exchangers 48 and 49 and subsequently used in the natural gas liquids recovery unit 32 to reduce the input refrigeration requirement and thus improve the efficiency of the overall process. More or less than two turbo expanders 46 and 47 and heat exchangers 48 and 49 may be used to reduce the pressure and recover the refrigeration created. The embodiment of FIG. 2 is otherwise identical to that of FIG. 1.

The process of this invention is designed for raw feed streams which have a carbon dioxide content in the range of about 10 to about 90 percent by volume. The pressure of the first and second stage membrane feed streams is maintained in the range of about 80 psig. to about 100 psig., preferably at about 90 psig, for optimum operating conditions. The temperature of the first and second membrane feed streams is maintained in the range of about 90 to about 110 degrees F., preferably at about 100 degrees F. for optimum operating conditions. The incoming membrane feed streams enter the bore of the membrane and are separated by the membrane.

The membranes can be formed of polysulfone, polyimid, polyamide, glassy polymer or cellulose acetate. In the preferred embodiment, preferably both membranes 18 and 20 comprise the same material, and preferably both have a selectivity greater than about 15:1 of carbon dioxide to hydrocarbons in the range of C1 to C6. The differential pressure of the nonpermeate stream of both membranes 18 and 20 is typically maintained in the range of about 5 to about 30 psig, and preferably at about 15 psig.

The permeate stream 62 from the first stage membrane 18 is preferably maintained to contain carbon dioxide in an amount substantially equivalent to or greater than about 60% carbon dioxide by volume, and is passed to a pipeline, liquified, or is used directly.

The nonpermeate stream 90 from the second stage membrane 20 is preferably maintained to contain carbon dioxide in an amount less than about 20% carbon dioxide by volume. The nonpermeate stream 90 flows to a pipeline or to downstream processing.

In the dehydration column 30, substantially all of the water vapor contained in the raw feed gas is removed to protect the membrane, to increase the efficiency and effectiveness of gas separation, and to reduce power requirements. The dehydration process can be recirculated triethylene glycol where the raw feed gas passes up through the column 30 in countercurrent flow to a lean triethylene glycol solution; adsorption by a desiccant where the raw feed gas passes down through a bed containing molecular sieves or activated alumina; or other combinations of these two dehydration processes.

In the NGL recovery column 32, portions of the raw feed stream are liquefied to remove from the system hydrocarbon portions having a carbon content predominantly heavier than C3 (propane). These removed portions are passed to the storage tank 40 since they are valuable products and include such heavier hydrocarbons.

The raw feed stream can be cooled to remove the heavier hydrocarbons by evaporating liquid refrigerant and bringing the resultant gaseous refrigerant into indirect heat exchange relationship with the raw feed stream in the column 32. It should also be understood that the raw feed stream can be cooled in column 32 by indirect heat exchange with an expanded portion of the raw feed stream.

In order to improve efficiency of the process and avoid the waste of power and cooling and heating properties of the process, generated physical properties of the system are utilized.

Referring to FIG. 2, the compression of gasses in the process produces heat which can be efficiently utilized in heat exchange relationship with other portions of the feed stream.

Referring to FIG. 3, turbine expanders 46,47 can be directly connected to drive a compressor of the process (not shown) or connected to a generator for the recovery of electrical power. The expansion of gases in the process generates cooling and this cooling can be efficiently utilized in heat exchange relationship with other portions of the feed streams.

In addition to the membrane gas—separation configuration shown in FIG. 1, the present invention can employ the configuration and system disclosed in co-pending U.S. patent application Ser. No. 09/057,126, filed Apr. 8, 1998, entitled MEMBRANE PROCESS FOR PRODUCING CARBON DIOXIDE, to Paul A. Daus, et al., which is hereby expressly incorporated by reference.

EXAMPLE I

With reference to FIG. 1, a raw gas of 31.054 MMSCFD at 85° F. and 155 psig, as described in Table 1, enters the process 8 on the line 10. There is sufficient pressure to move the gas through the process, so the raw gas first enters the dehydration unit 30. Within the dehydration unit 30, the raw gas is dehydrated by a desiccant filter that requires 1,117 SCFH of fuel gas to remove 135.145 lbs/hr of water.

The dry raw gas containing carbon dioxide, heavy hydrocarbons, and hydrogen sulfide, as described in Table 1, enters the Natural Gas Liquid recovery unit 32 where 41.439 gpm of liquid hydrocarbons are removed by a commercial propane refrigeration plant. The liquid hydrocarbon product stream is further described in Table 1. The refrigeration plant requires a total of 901.2 brake horsepower and 738 gpm of cooling water.

The raw gas stream leaves the propane refrigeration plant without sufficient pressure to economically justify turbine expansion for power recovery, so it enters the membrane separation portion of the process. It is separated into 20.703 MMSCFD of a permeate stream containing 94.029% carbon dioxide by volume and 8.566 MMSCFD of a nonpermeate stream containing 2.704% carbon dioxide by volume as further described in Table 1. The membrane separation portion of the process requires a total of 778.8 brake horsepower and 139 gpm of cooling water.

The permeate carbon dioxide product stream leaves the membrane portion of the process on the line 62 at 85° F. and 0 psig and enters the compressor 74 where the gas is compressed to meet downstream specifications. The nonpermeate hydrocarbon product stream leaves the membrane portion of the process at 96° F. and 80 psig and enters the compressor 102 where the gas is delivered downstream to be used as fuel gas or sold to a pipeline.

A total of 1,129 short tons per day of carbon dioxide on a 100% basis is produced by the process and requires a total of 1,680 brake horsepower, 877 gpm of cooling water, 1,117 SCFH of fuel gas, and 520 Generon membrane modules, as summarized in Table 3.

EXAMPLE II

Five million standard cubic feed per day of raw feed gas at 60° F. and 800 psig as further described in Table 2 enters the dehydration unit 30 and 1.457 lbs/hr of water are removed by a desiccant media. The dehydrated raw gas pressure is then let down by an expansion valve to 285.3 psig, resulting in a temperature drop to −10° F. The raw feed gas then enters a heat exchanger where it is heated back to 70° F. producing 429,500 BTU/hr of cooling. The dehydrated raw gas pressure is further let down by a second expansion valve to 102 psig, resulting in a temperature drop to 50.3° F. The raw feed gas then enters a second heat exchanger where it is heated back to 70° F. producing 97,450 BTU/hr of cooling. The cooling available is used to precool product CO2 gas prior to liquefaction in the downstream food grade liquid CO2 plant.

The 5 MMSCFD of dehydrated and pressure adjusted raw feed gas then enters a filter 60 where it is mixed with 1.279 MMSCFD of permeate at 100° F. that has been recycled from the second stage membrane 20 making a combined stream of 6.279 MMSCFD of feed gas at 91.7° F. The combined gas stream then passes through a coalescing filter, adsorption filter, and particulate filter within the filter 60 before entering the bore side of the first stage membrane 18 consisting of 69 membrane modules where separation takes place. In the first stage membrane 18, 83.42% of the incoming CO2 and 3.33% of each hydrocarbon component and nitrogen permeates the membrane and exits at 0 psig generating a CO2 vapor product stream of 3.858 MMSCFD containing 98.5% CO2 by volume. In this example the CO2 vapor stream is then sent to a commercial food grade liquid CO2 production plan to produce 208 short tons per day of liquid CO2 product at −15° F. and 250 psig.

A quantity of 2.421 MMSCFD of nonpermeate product stream from the first stage membrane, having a temperature of 90.7° F. and a pressure of 75 psig, then enters the second stage membrane 20 consisting of 94 membrane modules. No recompression of the nonpermeate stream is required in this case. In the second stage membrane, 95.85% of the incoming CO2 and 33.34% of each hydrocarbon component and nitrogen permeates the membrane and exists at 0 psig. The permeate stream is next recompressed to 102 psig then cooled to 100° F. requiring 217.4 brake horsepower before being recycled to the inlet of the filter system 60 and mixed with the raw feed gas stream ahead of the first stage membrane 18. A quantity of 1.142 MMSCFD of nonpermeate product stream from the second state membrane, containing 89.5% hydrocarbon, 2.7% CO2, and 7.8% nitrogen at a temperature of 90.4° F. and a pressure of 70 psig, then enters a product compressor where the pressure is increased to 202 psig requiring 68.5 brake horsepower and then a heat exchange where the product gas is cooled to 100° F.

The process gas rates and utility requirements for each example are summarized in Table 3.

TABLE 1

(Example 1)

| Stream | Raw Gas | NGL | CO2 | HC |
|---|---|---|---|---|
| Rate (MMSCFD) | 31.054 | | 20.703 | 8.566 |
| Rate (GPM @ T/P) | | 41.439 | | |
| Temperature (DEG. F.) | 85.000 | 150.13 | 85.011 | 96.339 |
| Pressure (PSIG.) | 155.000 | 154.000 | 0 | 80.000 |
| Composition (by volume) | | | | |
| Methane | 19.228% | 0.000% | 3.669% | 60.839% |
| Ethane | 6.119% | 0.008% | 1.168% | 19.361% |
| Propane | 5.529% | 38.262% | 0.652% | 10.804% |
| I-Butane | 0.640% | 8.560% | 0.032% | 0.528% |
| N-Butane | 1.930% | 28.108% | 0.072% | 1.190% |
| I-Penane | 0.430% | 7.295% | 0.005% | 0.085% |
| N-Pentane | 0.490% | 8.424% | 0.005% | 0.077% |
| N-Hexane | 0.420% | 7.532% | 0.001% | 0.012% |
| N-Octane | 0.100% | 1.809% | 0.000% | 0.000% |
| Nitrogen | 1.390% | 0.000% | 0.265% | 4.398% |
| Carbon Dioxide | 63.434% | 0.000% | 94.029% | 2.704% |
| Hydrogen Sulfide | 0.070% | 0.003% | 0.103% | 0.003% |
| Water | 0.220% | 0.000% | 0.000% | 0.000% |

TABLE 2

(Example 2)

| Stream | Raw Gas | CO2 | HC |
|---|---|---|---|
| Rate (MMSCFD) | 5.000 | 3.856 | 1.140 |
| Temperature (DEG. F.) | 60.000 | 81.345 | 100.000 |
| Pressure (PSIG) | 800.000 | 0 | 200.000 |
| Composition (by volume) | | | |
| Methane | 21.294% | 1.356% | 88.745% |
| Ethane | 0.170% | 0.011% | 0.709% |
| Propane | 0.000% | 0.000% | 0.000% |
| I-Butane | 0.000% | 0.000% | 0.000% |
| N-Butane | 0.000% | 0.000% | 0.000% |
| I-Penane | 0.000% | 0.000% | 0.000% |
| N-Pentane | 0.000% | 0.000% | 0.000% |
| N-Hexane | 0.000% | 0.000% | 0.000% |
| N-Octane | 0.000% | 0.000% | 0.000% |
| Nitrogen | 1.871% | 0.119% | 7.798% |

TABLE 2-continued (Example 2)

| Stream | Raw Gas | CO2 | HC |
|---|---|---|---|
| Carbon Dioxide | 76.650% | 98.514% | 2.748% |
| Hydrogen Sulfide | 0.000% | 0.000% | 0.000% |
| Water | 0.015% | 0.000% | 0.000% |

TABLE 3

| Feed Rate and Conditions | Example 1 | Example 2 |
|---|---|---|
| Inlet gas rate (MMSCFD) | 31.054 | 5.000 |
| CO2 feed concentration (MOLE %) | 63.44% | 76.65% |
| Inlet gas temperature (DEG. F.) | 85 | 60 |
| Inlet gas pressure (psig) | 155 | 800 |
| Product Rates and Conditions | | |
| Water Removed (lbs/hr) | 135.145 | 1.457 |
| Liquid HCS Removed (USGPM @ T/P) | 41.439 | |
| CO2 Produced (MMSCFD) | 20.703 | 3.856 |
| CO2 Produced on 100% basis (T/day) | 1,129 | 216.3 |
| HC Produced (MMSCFD) | 8.566 | 1.141 |
| Utilities | | |
| Fuel gas (dryer) (SCFH) | 1,117 | 25 |
| Booster Refrigerant Compressor (BHP) | 424.5 | |
| High Stage Refrigerant Compressor (BHP) | 476.7 | |
| Recycle Membrane Compressor (BHP) | 778.8 | 217.4 |
| Cooling water @ 15F Rise (USGPM) | 877 | 58 |
| Refrigeration made available @ −10 F. (BTU/Hr) | | 429,500 |
| Refrigeration made available @ −50 F. (BTU/Hr) | | 97,450 |
| Summary | | |
| Net compressor BHP required (BHP) | 1,680 | 217* |
| Cooling water required (USGPM) | 877 | 58 |
| Fuel gas required (SCFH) | 1,117 | 25 |
| Refrigeration available (tons) | | 44 |
| Membrane modules required | 520 | 163 |

*Does not include HC product compressor.

The purity of the permeate carbon dioxide product stream 62 from the first stage membrane 18 and the purity of the nonpermeate hydrocarbon product stream 90 from the second stage membrane 20 are greatly increased by the novel techniques employed in the process, specifically the use of bore fed, highly selective membranes operating at low pressure where the permeate gas stream from the second stage membrane 20 is recycled to the first stage membrane 18. The novel approach of using low pressure permits the use of a highly selective membrane and makes recycle practical.

Removal of contaminants, such as water, heavier hydrocarbons, compressor oil, and particulate, ahead of the membranes by the first and second filtering systems 60 and 84 extends the life of the membranes.

When a high pressure raw gas stream enters the process 8 on the line 10, as shown in FIG. 3, then the overall external power required by the process is further reduced because, as the gas stream flows through the turbine expanders 46 and 47 and expands, both mechanical horsepower and the cooling are produced and recovered for use by the process. The mechanical power recovered is used to make electric power either with a generator or by directly coupling shafts of the turbine expanders 46 and 47 to compressor shafts. The cooling that results from expanding the raw gas is used to reduce the external cooling required by the process to achieve the optimum membrane performance and may also be bused to reduce the external refrigeration needed in the natural gas liquid recovery plant 32.

Although the present invention and its advantages have been described in detail, it should be understood that various changes, substitutions, and alterations can be made therein without departing from the spirit and scope of the invention as defined by the appended claims. For example, where the raw feed gas contains hydrogen sulfide in amounts less than about 5%, the hydrogen sulfide can either be removed before dehydration or it will permeate along with the carbon dioxide and can be removed from the product gas streams by downstream treating processes. Other aspects, objects and advantages of this invention can be obtained from a study of the drawings, the disclosure, and the appended claims.

It is claimed:

1. A process for separating carbon dioxide from a raw feed stream containing natural gas and carbon dioxide, comprising:

dehydrating the raw feed stream;

liquefying and removing from the system, natural gas liquids from the raw feed stream and resultingly forming a treated feed stream;

altering the temperature and pressure of said treated feed stream to preselected values of an optimum operating range of a first stage membrane and resultingly forming a first altered feed stream;

filtering the first altered feed stream in a first filtering system and forming a first stage membrane feed stream;

passing the first stage membrane feed stream through the first stage membrane and resultingly separating said feed stream into a first permeate stream and a first nonpermeate stream;

recovering the first permeate stream;

altering the temperature and pressure of the first nonpermeate stream to preselected values of a second stage membrane and forming a second altered feed stream;

filtering the second altered feed stream in a second filtering system to form a seocnd stage membrane feed stream;

passing the second stage membrane feed stream through a second stage membrane and resultingly separating said feed stream into a second permeate stream and a second nonpermeate stream;

recovering the second nonpermeate stream;

altering the temperature and pressure of the second permeate stream to a preselected value of the optimum operating ranges of the first stage membrane; and recycling the temperature and pressure altered second permeate stream into the first filter system.

2. The process, as set forth in claim 1, wherein the raw feed stream comprises hydrocarbons, nitrogen, oxygen, hydrogen, and carbon dioxide.

3. The process, as set forth in claim 1, wherein the raw feed stream contains carbon dioxide in the range from about 10 to about 90 percent by volume.

4. The process, as set forth in claim 1, wherein the raw feed stream contains hydrogen sulfide.

5. The process, as set forth in claim 1, wherein the raw feed stream contains water vapor.

6. The process, as set forth in claim 1, wherein the raw feed stream contains natural gas liquids.

7. The process, as set forth in claim 1, wherein the pressure of the first stage membrane feed stream is about 90 psig.

8. The process, as set forth in claim 1, wherein the raw feed stream is dehydrated.

9. The process, as set forth in claim 8, wherein dehydration of the raw feed stream is in response to directly contacting the raw feed stream with an ethylene glycol solution.

10. The process, as set forth in claim 8, wherein dehydration of the raw feed stream is in response to directly contacting the raw feed stream with a desiccant.

11. The process, as set forth in claim 1, including cooling the raw feed stream, liquefying a portion of the raw feed stream, and removing the liquefied portion.

12. The process, as set forth in claim 11, wherein the liquefied and removed portions of the raw feed stream include heavier hydrocarbons.

13. The process, as set forth in claim 12, wherein the heavier hydrocarbons have a carbon content predominantly greater than about C3.

14. The process, as set forth in claim 11, including evaporating liquid refrigerant in indirect heat exchange relationship with the raw feed stream for cooling the raw feed stream to a temperature sufficient for liquefying a portion of said stream.

15. The process, as set forth in claim 11, wherein the raw feed stream is cooled in response to indirect heat exchange with an expanded portion of the raw feed stream.

16. The process, as set forth in claim 1, wherein the raw feed stream is a high pressure feed stream and wherein the temperature and pressure are altered in response to expanding said high pressure feed stream through at least one expansion turbine.

17. The process, as set forth in claim 16, including altering the temperature and pressure in response to expanding said high pressure feed stream through a plurality of expansion turbines.

18. The process, as set forth in claim 16, including recovering power generated by expanding said high pressure feed stream through the expansion turbine.

19. The process, as set forth in claim 16, including recovering the cooling properties resulting from expansion of gases in the process and utilizing said cooling properties in heat exchange relationship within the process.

20. The process, as set forth in claim 1, wherein the first altered feed stream is filtered by passing said stream, in the first filtering system, a absorption coalescing filter, thereafter through an absorption filter and thereafter through a particulate filter.

21. The process, as set forth in claim 20, including removing oil and particulate from the altered feed stream in response to passing said stream through the first filtering system.

22. The process, as set forth in claim 20, wherein the second altered feed stream is filtered by passing said stream, in the second filtering system, through a coalescing filter, thereafter through an absorption filter, and thereafter through a particulate filter.

23. The process, as set forth in claim 1, wherein the first stage membrane includes a membrane having a bore surface and a shell surface and including maintaining the pressure and temperature on the bore surface at a pressure in the range of about 80 to about 100 psig and at a temperature in the range of about 90° F. degrees to about 110° F.

24. The process, as set forth in claim 23, wherein the pressure is maintained at about 90 psig. and the temperature is maintained at about 100° degrees F.

25. The process, as set forth in claim 1, wherein the first stage membrane has a membrane formed of polysulfone, polyimid, polyamide, glassy polymer and cellulose acetate.

26. The process, as set forth in claim 25 wherein the second stage membrane has a membrane formed of one of polysulfone, polyimid, polyamide, glassy polymer, and cellulose acetate.

27. The process, as set forth in claim 1, wherein the second stage membrane has a membrane formed of one of polysulfone, polyimid, polyamide, glassy polymer, and cellulose acetate.

28. The process, as set forth in claim 1, wherein the first stage membrane has a membrane having a selectivity greater than 15:1 of carbon dioxide to hydrocarbons in the range of C1 to C6.

29. The process, as set forth in claim 1, wherein the differential pressure of the nonpermeate stream of the first stage membrane is maintained in the range of about 5 to about 30 psig.

30. The process, as set forth in claim 1, wherein the differential pressure of the nonpermeate stream of the first membrane is maintained at about 15 psig.

31. The process, as set forth in claim 1, wherein the first stage membrane is a hollow fiber membrane having a bore and wherein the first stage membrane feed stream is passed into the bore of the membrane.

32. The process, as set forth in claim 31, wherein the second stage membrane is a hollow fiber membrane having a bore and wherein the second stage membrane feed stream is passed into the bore of the membrane of the second stage membrane.

33. The process, as set forth in claim 1, wherein the second stage membrane is hollow fiber membrane having a bore and wherein the second stage membrane feed stream is passed into the bore of the membrane of the second stage membrane.

34. The process, as set forth in claim 1, including compressing and cooling the first nonpermeate stream from the first stage membrane prior to entry into the second stage membrane.

35. The process, as set forth in claim 34, wherein the first non permeate stream from the first stage membrane is compressed by passing the first nonpermeate stream through one of a reciprocating compressor, a centrifugal compressor, and a screw compressor.

36. The process, as set forth in claim 34, wherein the first non permeate stream from the first stage compressor is compressed by passing the nonpermeate stream through a screw compressor.

37. The process, as set forth in claim 1, wherein the second stage membrane has a membrane having a selectivity of about 15:1 carbon dioxide to hydrocarbons in the range of C1 to C6.

38. The process, as set forth in claim 37, wherein the first stage membrane has a membrane having a selectivity of about 15:1 carbon dioxide to hydrocarbons in the range of C1 to C6.

39. The process, as set forth in claim 1, wherein the differential pressure of the second nonpermeate stream from the second stage membrane is maintained in the range of about 5 to about 30 psig.

40. The process, as set forth in claim 39, wherein the differential pressure of the nonpermeate stream from the second stage membrane is maintained at about 15 psig.

41. The process, as set forth in claim 39, wherein the differential pressure of the first nonpermeate stream from the first stage membrane is maintained in the range of about 5 to about 30 psig.

42. The process, as set forth in claim 39, wherein the differential pressure of the non permeate stream of the first membrane is maintained at about 15 psig.

43. The process, as set forth in claim 1, including compressing and cooling the second permeate stream from the second stage membrane prior to recycling to the first stage membrane.

44. The process, as set forth in claim 43, wherein the second permeate stream of the second stage membrane is compressed by passing said permeate stream through one of a reciprocating compressor, a centrifugal compressor, and a screw compressor.

45. The process, as set forth in claim 43, wherein the second permeate stream of the second stage membrane is compressed by passing said permeate stream through a screw compressor.

46. The process, as set forth in claim 1, including maintaining the first permeate stream from the first stage membrane to contain carbon dioxide in an amount substantially equivalent to or greater than about 60% carbon dioxide by volume.

47. The process, as set forth in claim 1, including liquefying the first permeate stream.

48. The process, as set forth in claim 1, including maintaining the nonpermeate second stream from the second stage membrane at less than about 20% carbon dioxide by volume.

49. The process, as set forth in claim 1, wherein altering the temperature of at least a portion of the streams of the separating process, for cooling said streams, is in response to bringing the stream to be cooled into heat exchange relationship with a colder fluid resulting from expansion of a feed stream of the separating process.

50. The process, as set forth in claim 1, wherein altering the temperature of at least a portion of the streams of the separating process, for heating, said streams, is in response to bringing the stream to be heated into heat exchange relationship with a hotter fluid resulting from compression of a feed stream of the separating process.

51. The process, as set forth in claim 1 including compressing a low pressure feed stream with a compressor to the optimum pressure.

52. A process for separating carbon dioxide from a raw feed stream containing natural gas and carbon dioxide, said feed stream having one of a low, near optimum and high pressure, comprising:

dehydrating the raw feed stream;

condensing and removing natural gas liquid from the raw feed stream and forming a treated feed stream;

coalescing, absorbing and particulate filtering the resultant altered, treated feed stream in a first filtering system and forming a first stage feed stream;

passing the first stage feed stream from the first filtering system through a first stage membrane, separating said first stage feed stream into a first permeate stream and a first nonpermeate stream, and controlling the differential pressure of said first non permeate stream in the range of about 5 to about 30 psig.;

recovering the first permeate stream discharging from the first stage membrane;

altering the temperature and pressure of the first nonpermeate stream to preselected values of the optimum operating ranges of a second stage membrane;

coalescing, absorbing and particulate filtering the resultant temperature and pressure altered first nonpermeate stream and forming a second stage feed stream;

passing the second stage feed stream through a second stage membrane, separating said feed stream into a second permeate stream and a second nonpermeate stream and controlling the pressure differential of said second nonpermeate stream in the range of about 5 to about 30 psig.;

altering the temperature and pressure of the second permeate stream to preselected values of the optimum operating ranges of the first stage membrane; and recycling the temperature and pressure altered second permeate stream into the first filtering system.

53. A process for separating carbon dioxide from a raw gas feed stream containing natural gas and carbon dioxide, comprising:

providing first and second stage membranes, each membrane having an optimum operating pressure and temperature range;

increasing the pressure of the incoming raw gas feed stream to the optimum operating pressure range of the first stage membrane;

dehydrating the incoming raw gas feed stream and removing water from said stream forming a resultant dehydrated feed stream;

cooling the dehydrated feed stream to a temperature sufficient to condense a portion of said dehydrated feed stream and removing natural gas liquid from the dehydrated feed stream and forming a resultant treated gas stream;

passing the resultant near optimum pressure treated gas stream through an associated heat exchanger, resultingly altering the temperature to a preselected operating temperature of the first stage membrane, and forming a resultant fourth stream;

passing the resultant fourth stream and a recycle stream through a first coalescing, absorption and particulate filtering system and forming a first stage membrane feed stream;

passing the filtered first stage membrane feed stream through the first stage membrane and separating therein said filtered first stage feed stream into a first permeate stream and a first nonpermeate stream;

controlling the pressure of the first non-permeate stream of the first stage membrane;

recovering the high purity first permeate stream passing from the first stage membrane;

altering the temperature and pressure of the first nonpermeate stream passing from the first stage membrane to preselected temperature and pressure corresponding to optimum operating temperature and pressure of the second stage membrane;

filtering the altered first nonpermeate stream through a coalescing, absorption, and particulate filter;

passing the filtered, temperature and pressure altered first nonpermeate stream through the second stage membrane and separating said filtered and altered first nonpermeate stream into a recycle permeate stream and a second nonpermeate stream;

controlling the pressure of the second non-permeate stream exiting the second stage membrane;

altering the temperature and pressure of the recycle permeate stream passing from the second stage membrane to preselected temperature and pressure corresponding to optimum operating ranges of the first membrane, and recycling said recycle permeate stream to the first filtering system; and recovering the second nonpermeate stream passing from the second stage membrane.

* * * * *

UNITED STATES PATENT AND TRADEMARK OFFICE
CERTIFICATE OF CORRECTION

PATENT NO.   : 6,128,919
DATED        : October 10, 2000
INVENTOR(S)  : Daus et al.

It is certified that error appears in the above-identified patent and that said Letters Patent is hereby corrected as shown below:

Title page,
Item [56], References Cited, U.S. PATENT DOCUMENTS,

| | | |
|---|---|---|
| 3,307,330 | 3/1967 | Niedzielski et al. |
| 4,881,953 | 11/1989 | Prasad et al. |

FOREIGN PATENT DOCUMENTS,

| | | |
|---|---|---|
| GB 2 005 152 A | 4/1979 | United Kingdom |
| 0 110 858 A1 | 6/1984 | European Pat. Off. |
| WO 92/19358 | 11/1992 | WIPO |

Column 2,
Line 58, delete "feed gas" and insert -- gas feed --
Line 64, delete "steams" and insert -- feed streams --

Column 3,
Line 11, delete "feed gas" and insert -- gas feed --
Line 13, delete "feed gas" and insert -- gas feed --
Line 16, delete "feed gas" and insert -- gas feed --
Line 22, delete "forst a;tered" and insert -- first altered --
Line 23, delete "and"

Column 6,
Line 40, delete "feed" and insert -- feet --

Column 7,
Line 3, delete "plan" and insert -- plant --
Line 18, delete "state" and insert -- stage --

Column 9,
Line 4, delete "bused" and insert -- used --
Line 40, delete "seocnd" and insert -- second --

UNITED STATES PATENT AND TRADEMARK OFFICE
CERTIFICATE OF CORRECTION

PATENT NO.     : 6,128,919
DATED          : October 10, 2000
INVENTOR(S)    : Daus et al.

It is certified that error appears in the above-identified patent and that said Letters Patent is hereby corrected as shown below:

Column 10,
Line 44, after "system," insert -- through --; and delete "absorption"

Column 11,
Line 29, after "is", insert -- a --
Line 44, after "the", insert -- first --

Column 12,
Line 7, after "said", insert -- second --
Line 22, delete "nonpermeate second" and insert -- second nonpermeate --
Line 33, after "heating", delete the -- , --
Lines 47-48, delete "resultant altered,"

Signed and Sealed this

Twelfth Day of February, 2002

*Attest:*

JAMES E. ROGAN
*Attesting Officer*   *Director of the United States Patent and Trademark Office*